United States Patent
Salamon et al.

(10) Patent No.: US 9,215,227 B2
(45) Date of Patent: Dec. 15, 2015

(54) SYSTEMS AND METHODS FOR NETWORK COMMUNICATIONS

(71) Applicants: Gary Salamon, Malvern, PA (US); Jerry Bassett, Malvern, PA (US); David Maw, Irvine, CA (US); William Deck, Malvern, PA (US)

(72) Inventors: Gary Salamon, Malvern, PA (US); Jerry Bassett, Malvern, PA (US); David Maw, Irvine, CA (US); William Deck, Malvern, PA (US)

(73) Assignee: Unisys Corporation, Blue Bell, PA (US)

( * ) Notice: Subject to any disclaimer, the term of this patent is extended or adjusted under 35 U.S.C. 154(b) by 146 days.

(21) Appl. No.: 13/974,083

(22) Filed: Aug. 23, 2013

(65) Prior Publication Data

US 2015/0058946 A1 Feb. 26, 2015

(51) Int. Cl.
*H04L 29/06* (2006.01)

(52) U.S. Cl.
CPC .............. *H04L 63/08* (2013.01); *H04L 63/166* (2013.01); *H04L 29/0602* (2013.01)

(58) Field of Classification Search
CPC .. H04L 63/08; H04L 29/0602; G06F 13/4252
USPC ........................................................... 726/7
See application file for complete search history.

(56) References Cited

U.S. PATENT DOCUMENTS

| | | | | |
|---|---|---|---|---|
| 6,621,895 | B1* | 9/2003 | Giese | 379/201.03 |
| 2005/0267935 | A1* | 12/2005 | Gandhi et al. | 709/203 |
| 2006/0013253 | A1* | 1/2006 | Hufferd | 370/466 |
| 2007/0171921 | A1* | 7/2007 | Wookey et al. | 370/401 |
| 2009/0106834 | A1* | 4/2009 | Borzycki et al. | 726/21 |
| 2012/0182892 | A1* | 7/2012 | Frazier et al. | 370/252 |
| 2012/0275598 | A1* | 11/2012 | Vimpari et al. | 380/255 |

* cited by examiner

*Primary Examiner* — Izunna Okeke
*Assistant Examiner* — Bryan Wright
(74) *Attorney, Agent, or Firm* — Richard J. Gregson (57) ABSTRACT

Systems and methods enable a method including: providing a first system; generating data to be sent over a network link; determining a transport protocol that will be used to transmit data over the network communication link; negotiating connection services to be performed on data that will transmitted over the network communication link; sending a request to open a network communication link; sending a request to the connectivity services of the second system for credentials of the second system; receiving the credentials from the connectivity services module of the second system; verifying that the credentials match an authenticated computer system; opening a network connection between the first system and the second system when the second system's credentials have been verified by the connectivity services module of the first system; and transmitting the data to the second system according to the determining network protocol and negotiated connection services.

20 Claims, 5 Drawing Sheets

SYSTEMS AND METHODS FOR NETWORK COMMUNICATIONS

TECHNICAL FIELD

The present invention relates generally to network communication.

BACKGROUND

Modern computers connect to networks in order to receive and send information. By receiving information from other computers, the capabilities of a computer system greatly expand. For example, a computer connected to the Internet can download a wealth of information, which is not necessarily stored in the physical data storage drives of the computer, or the computer can communicate with other computers. The Internet exemplifies most of the benefits provided by networking computers.

Networked computers offer users an expanded user experience through the Internet. Users can access information quickly and freely using web-browsing software. More recently, computer companies are using networks to introduce parallel processing under the theory that a group of computers processing information in parallel can solve a problem more efficiently than one computer working alone. Virtual machines, virtual appliances, cloud computing, massively parallel processing systems, and many other examples exhibit how computers using networks expand their processing capabilities.

The following is an example of a computer using TCP/IP to perform Internet communication over a series of networks. Networking relies on a number of software layers to send information over a network. At the top, an application layer interacts with a user and processes tasks under the command of a user. Whenever an application needs to communicate with another computer, which may be running another application, the application calls upon an Internet layer to handle delivery of data. The Internet layer commonly implements the Internet Protocol ("IP"), such as IPv4 or IPv6. The Internet protocol creates packets of information, which are a sequence of octets containing a header and body. The header describes the packets source, destination, and control information, while the body describes the data being transmitted. The IP layer then transmits the created packet through network hardware, such as an Ethernet link, to another computer system. When the packet arrives at the destination computer, the destination computer calls upon a transport layer. Commonly, the transport layer relies on transmission control protocol (TCP) to provide a communication service. Due to network congestion or unpredictable network behavior, some data packets may be lost, corrupted, or delivered out of order. In general, TCP detects problems in the received packets, requests retransmission of lost data, rearranges out-of-order data, and reassembles the received data so that an application on the receiving computer system may process the received data.

For example, in the context of a website, a server may send an HTML file describing a website hosted by the server. The server calls the TCP layer to divide the HTML file into a sequence of segments, and the TCP layer forwards the segments to the IP layer. The IP layer creates IP packets for transmission by adding a header that includes, among other things, a destination IP address. When a client computer receives the IP packets from the server, the TCP layer on the client side reassembles the received packets, and any other processes, to assure that all data is received by the server. The TCP layer then streams the information to a web-browser running on the client computer, the web-browser processes the information and displays the website.

In general, a networking API defines an interface between an application and the underlying network stack. For example, an application running on the Microsoft® Windows® operating system calls the Windows Sockets API ("Winsock") to access the underlying TCP/IP protocol stack. Winsock guarantees that a conforming application will function with a conforming protocol implementation from any network software vendor.

While TCP/IP and networking APIs perform many important steps for network communication, these software layers cannot perform many other important network functions. For example, authentication services are left up to the application layer to perform. More specifically, if a client computer requests access to a website, TCP/IP creates the request on the client side, and TCP/IP on the server side unpackages the transmitted data and sends the unpackaged data to the application hosting the website. Upon receiving the request for access, the application performs authentication services by checking a username and password. In other words, a connection between the host computer and the client computer is opened before the host computer has a chance to authenticate the user.

Also, because the TCP/IP stack has an agreed upon standard, the TCP/IP stack cannot be changed by an application. So, an application must specify its communication protocols, like security protocols, type of networking protocols, etc. So, an application developer would need to perform a software update anytime he wished to change how the application transmits data. For example, a public connection may use TCP/IP, but a more private connection may call for a different type of protocol, such as Infinband. But, because of the inherent problems of updating an application, a developer may decide against changing the called network protocol.

In light of all these problems, there exists a need in the art to securely open network connections and avoid application updates for network transmission changes.

SUMMARY

The systems and methods described herein attempt to overcome the drawbacks discussed above by creating a network API capable of creating a messaged-based connectivity layer. The connectivity layer chooses a transport protocol, performs authentication services, and encrypts data for additional security. By creating this connectivity layer, applications no longer need to perform authentication services or data encryption, but simply pass data along to the connectivity layer where data is encrypted and other computers are authenticated.

The connectivity layer provides additional security. Firstly, the connectivity layer prevents unauthorized access. During the connection handshake, authentication credentials are exchanged. If the authentication credentials do not match acceptable credentials, a connection between a first computer and a second computer fails. In this way, a first computer prevents unauthorized access, and an application running on the first computer does not need to process authentication information. Also, the connectivity layer may encrypt data before sending the data over a network. As a result, data sent through the network transmits securely, and the application may be ignorant to any encryption keys used when encrypting data for additional security. In this way, only the connectivity layer possesses the encryption keys necessary to translate the data into a readable format.

Through all of the improvements demonstrated by including the connectivity layer, network communication becomes more secure. Also, applications may be upgraded without changing the network protocols. The application simply calls the connectivity layer API whenever a network transmission needs to be made. Also, the connectivity layer may determine which transport protocol best servers the intended transmission. The transport protocol may be any understood protocol including TCP/IP, Infiniband, user datagram protocol (UDP), or any other network protocol.

In one embodiment, a computer program product, comprising a computer usable medium having a computer readable program code embodied therein, the computer readable program code adapted to be executed to implement a method for network communication, the method comprises providing a first system, wherein the first system comprises distinct software modules, and wherein the distinct software modules comprises a user application module, a network application programming interface module, a connectivity services module, and a transport protocol module; generating, by the user application module, data to be sent over a network link based on at least one process performed by the user application module or information entered by a user; sending, by the network application programming interface module, a request to open the communication link to the connectivity services module; determining, by the connectivity services module of the first system, a transport protocol that will be used to transmit data over a network communication link; sending, by the connectivity services module of the first system, a request to open the network communication link to the transport module in response to a request by the user application module; negotiating, by the connectivity services module of the first system or a connectivity services modules of a second system, connection services to be performed on data that will transmitted over the network communication link with a connectivity services module of a second system; receiving, by the connectivity services of the first system, a request for credentials of the first system for sending to the connectivity services module of the second system to verify that the credentials match an authenticated computer; opening, by the connectivity services module of the first system, a network connection between the first system and the second system when the first system's credentials have been verified by the connectivity services module of the second system; and transmitting, by the transport protocol module and the connectivity services module of the first system, the data to the second system according to the determining network protocol and negotiated connection services.

In another embodiment, a computer program product, comprising a computer usable medium having a computer readable program code embodied therein, the computer readable program code adapted to be executed to implement a method for network communication, the method comprises providing a first system, wherein the first system comprises distinct software modules, and wherein the distinct software modules comprises a user application module, a network application programming interface module, a connectivity services module, and a transport protocol module; sending, by the network application programming interface module, a request to open the communication link to the connectivity services module; determining, by the connectivity services module of the first system, a transport protocol that will be used to transmit data over a network communication link; sending, by the connectivity services module of the first system, a request to open the network communication link to the transport module in response to a request by the user application module; negotiating, by the connectivity services module of the first system or a connectivity services modules of a second system, connection services to be performed on data that will transmitted over the network communication link with a connectivity services module of a second system; receiving, by the connectivity services module of the first system, a request from the connectivity services of the second system for credentials of the first system; sending, by the connectivity services module of the first system, the first system's credentials to the connectivity services module of the second system; opening, by the connectivity services module of the first system, a network connection between the first system and the second system when the first system's credentials have been verified by the connectivity services module of the second system; and transmitting, by the transport protocol module and the connectivity services module of the first system, the data to the second system according to the determined network protocol and negotiated connection services.

In yet another embodiment, a computer program product, comprising a computer usable medium having a computer readable program code embodied therein, the computer readable program code adapted to be executed to implement a method for network communication, the method comprises providing a first system, wherein the first system comprises distinct software modules, and wherein the distinct software modules comprises a user application module, a connectivity services module, and a transport protocol module; determining, by the connectivity services module of the first system, a transport protocol that will be used to transmit data over the network communication link; receiving, by the connectivity services module of the first system, a request to open a communication link from the transport module, wherein the request was initiated by the connectivity services module of a second system; negotiating, by the connectivity services module of the first system or a connectivity services module of the second system, connection services to be performed on data that will transmitted over the network communication link during a network handshake, wherein negotiating includes determining a size and format for messages to be sent from the second computer to the first computer; receiving, by the connectivity services module of the first system, by the connectivity services of the first system a request for credentials of the first system for sending the credentials to the second system to verify that the credentials match an authenticated computer, opening, by the connectivity services module of the first system, a network connection between the first system and the second system when the first system's credentials have been verified by the connectivity services module of the second system; receiving, by the transport protocol module of the first system, data from the second system according to the determining network protocol and negotiated connection services; sending, by the transport protocol module of the first system, the received data to the connectivity services module of the first system; translating, by the connectivity services module of the first system, the received data into a message based on the agreed upon message size and format; and sending, by the connectivity services module of the first system, the message to the user application module.

In another embodiment, a computer program product, comprising a computer usable medium having a computer readable program code embodied therein, the computer readable program code adapted to be executed to implement a method for network communication, the method comprises providing a first system, wherein the first system comprises distinct software modules, and wherein the distinct software modules comprises a user application module, a connectivity services module, and a transport protocol module; determining, by the connectivity services module of the first system, a transport protocol that will be used to transmit data over the network communication link; receiving, by the connectivity services module of the system, a request to open a communication link from the transport module, wherein the request was initiated by a connectivity services module of a second system; negotiating, by the connectivity services module of the first system, connection services to be performed on data that will transmitted over the network communication link with a connectivity services module of a second system during a network handshake, wherein negotiating includes determining a size and format for messages to be sent between the second system and the first system; determining, by the connectivity services module of the first system, whether to require credentials before allowing access to the second system; opening, by the connectivity services module of the first system, a network connection between the first system and the second system when the second system's credentials have been verified by the connectivity services module or when the connectivity services module of the first system grants access to the second system without requiring validated credentials; receiving, by the transport protocol module of the first system, data from the second system according to the determined network protocol and negotiated connection services; sending, by the transport protocol module of the first system, the received data to the connectivity services module of the first system; translating, by the connectivity services module of the first system, the received data into a message based on the agreed upon message size and format; and sending, by the connectivity services module and the network application interface module of the first system, the message to the user application module.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Reference will now be made in detail to the preferred embodiments, examples of which are illustrated in the accompanying drawings.

The embodiments described above are intended to be exemplary. One skilled in the art recognizes that numerous alternative components and embodiments may be substituted for the particular examples described herein and still fall within the scope of the invention.

Figure 1:
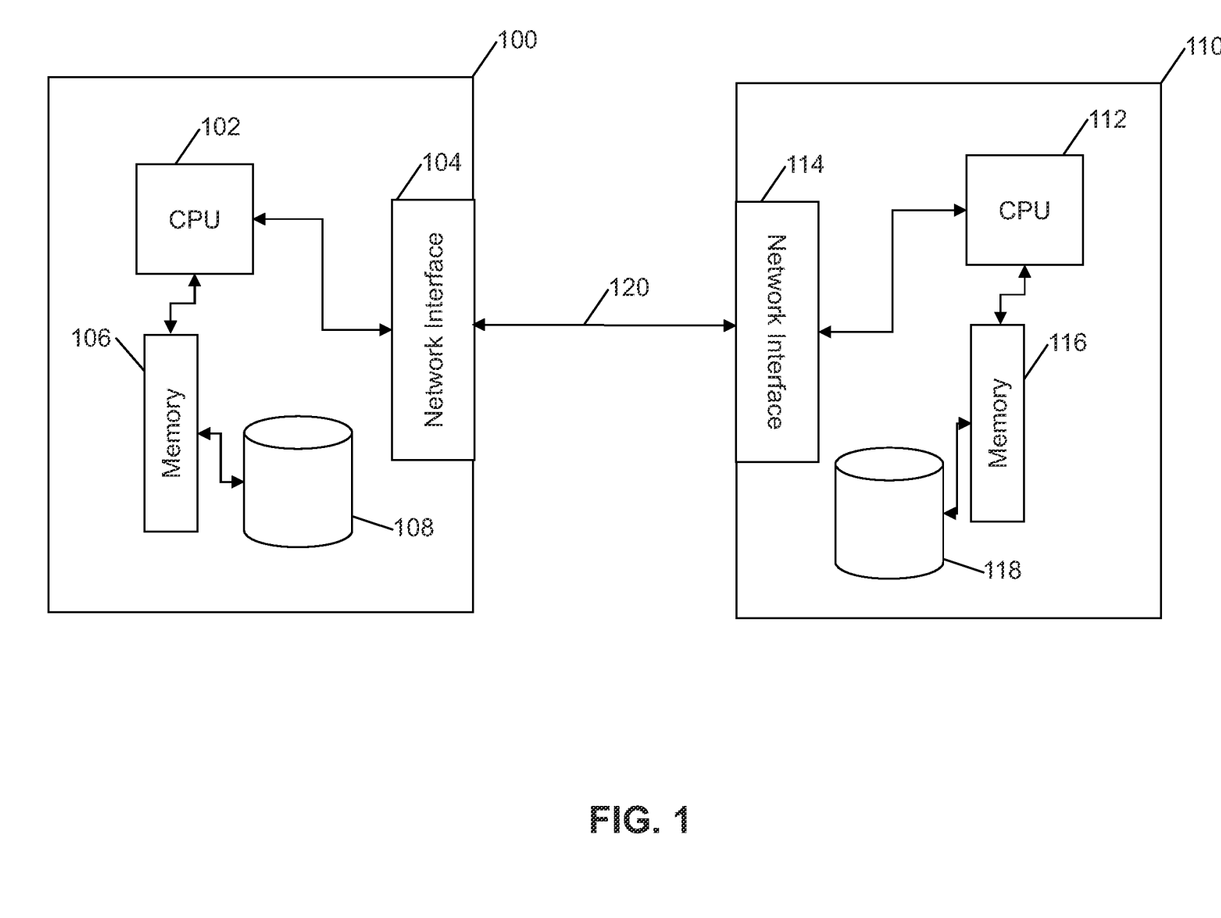
FIG. 1 illustrates a pair of networked computers according to an exemplary embodiment.

Referring to FIG. 1, a host computer system 100 is connected to and in communication with a client computer system 110. The client computer system 110 communicates with the host computer 100 through a network 120. The client computer system 110 may receive data from the host computer system 100 or send data to the host computer 100 in a variety of different configurations, for example, in the situation where the host computer system 100 is a web-server, and the host computer system 100 provides website data to the client computer system 110 when the client computer system 110 accesses the website hosted by the host computer system 100. In another example, the host computer system 100 provides access to virtual computing resources to the client computer system 110 over the network 120 (i.e. in a infrastructure-as-a-service (IaaS) cloud). In another embodiment, the host computer system 100 and the client computer system 110 are partitions of servers in a datacenter. The client computer 110 may be, but is not limited to, a remote computer system.

The host computer system 100 at least includes a processor 102, a block of memory 106, a network interface 104, and physical storage 108. The client computer 110 also at least includes a processor 112, a block of memory 116, a network interface 114, and physical storage 118. The hardware of the host and client computers 102, 104, 106, 108, 112, 114, 116, 118 may communicate through one or more data buses, as illustrated by the arrows within the computers 100, 110. While the elements listed above are illustrated in FIG. 1, it is to be understood that the host computer 100 and the client computer 110 may include many more hardware components, such as a CD-ROM drive, DVD-ROM drive, tape drive, audio modules, universal serial bus (USB) ports, power supplies, cooling devices, heat sinks, network interfaces, or any other components that may be included in a computing device. While a single client computer 110 is illustrated as connected to the host computer 100, the host computer 100 may connect to a plurality of client computers. The size and configuration of the host computing system 100 may increase or decrease depending on computing model, customer need, or the number of client computers 110 connected to the host computer 100.

The processor 102 may be computer hardware configured to execute instructions of a computer program, which may be saved in the memory 104, and perform basic logical operations of the host computer 100. The processor 102 may be embodied by one or more processors if the host computer 100 is a multi-processor system. If the host computer 100 has multiple processors 102, each processor 102 may perform a different task, and each processor 102 may be differently configured to accommodate their specific tasks. Alternatively, all of the processors 102 may be constructed in the same manner, and one or more of the processors 102 may be a spare processor 102 included for redundancy. Additionally, one or more of the processors 102 may provide supervisory control over the other processors 102. The processor 102 may have any clock speed or performance characteristics necessary to perform network communication and execute the software routines defining the network communication software modules.

The processor 112 may also be computer hardware configured to carry out the instruction of a computer program, which may be saved in the memory 116 or the physical storage 118. The processor 112 of the client computer 110 may have lighter performance specifications when compared to the processor 102 of the host computer 100 because the client computer 110 may not perform heavy processing tasks. However, in general, the processor 112 may be similar in design to the processor 102. The processor 112 may have any clock speed or performance characteristics necessary to perform network communication and execute the software routines defining the network communication software modules.

The memory 106 or 116 may include any computer storage medium, either volatile or non-volatile, removable or non-removable, such as FLASH, RAM, ROM, EEPROM, or any other storage medium that is configured to store information according to any method or technology. The memory 106 or 116 is configured to store computer readable information, such as computer readable instructions and data. The memory 106 or 116 may be implemented to store program code to direct the processor 102 or 112 to process information and requests to or from other computing systems connected to the host computer system 100 or client computer 110 in any manner, such as through the network interface 104 or 114.

The network interface 104 or 114 provides a network connection means and network protocols useful for sending and receiving information from and to other computer systems connected to the host computer 100 or the client computer 110. The network interface 104 or 114 may be connected to a network of any type, such as a local area network (LAN), a wide area network (WAN), or a wireless local area network (WLAN). The network interface 104 or 114 may communicate with other computer systems on the network 120 through network protocols, such as TCP/IP, FTP, SSH, Infiniband or any other network protocol. In addition, the network interface 104 or 114 may be connected to a network through any means including wireless means, such as Bluetooth, IEEE 802.11, and infrared, or wired means, such as Ethernet, firewire, and coaxial. The network communication protocol may be message-based or packet-based. As will be described below, the additional software layers of the exemplary embodiments assure that all network communication is, after some translation, message-based.

Figure 2:
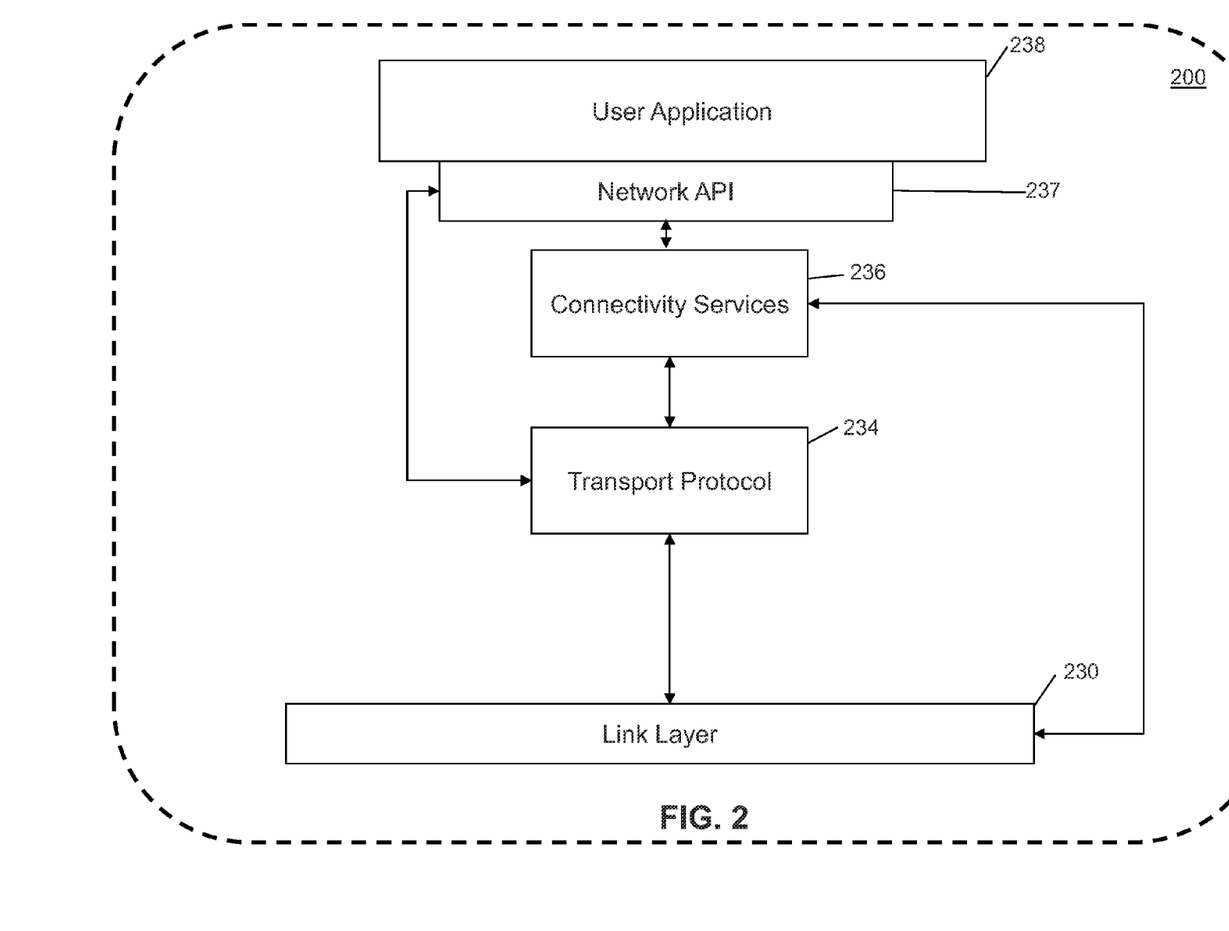
FIG. 2 illustrates network communication software layers of a host computer system according to an exemplary embodiment.
Figure 3:
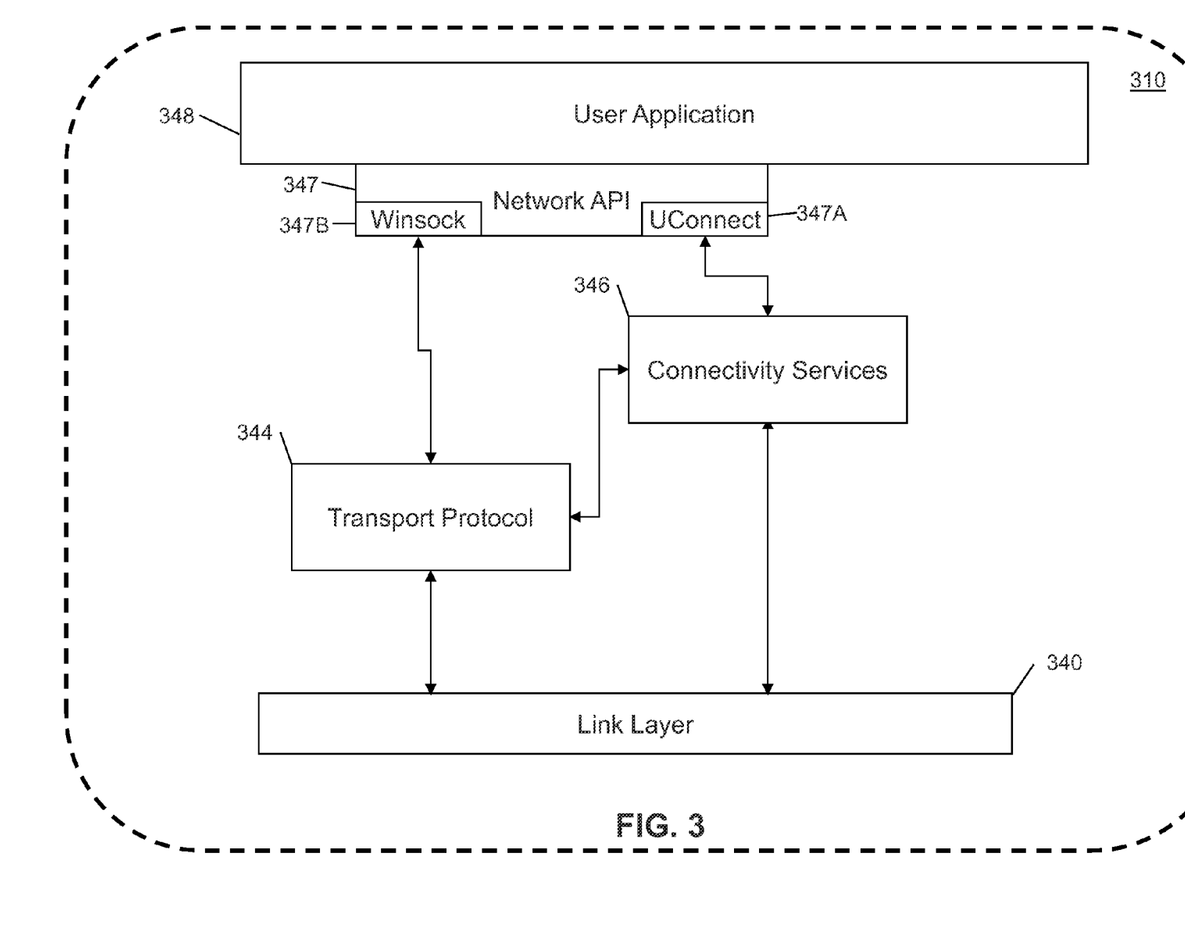
FIG. 3 illustrates network communication software layers of a client computer system according to an exemplary embodiment.
Figure 4:
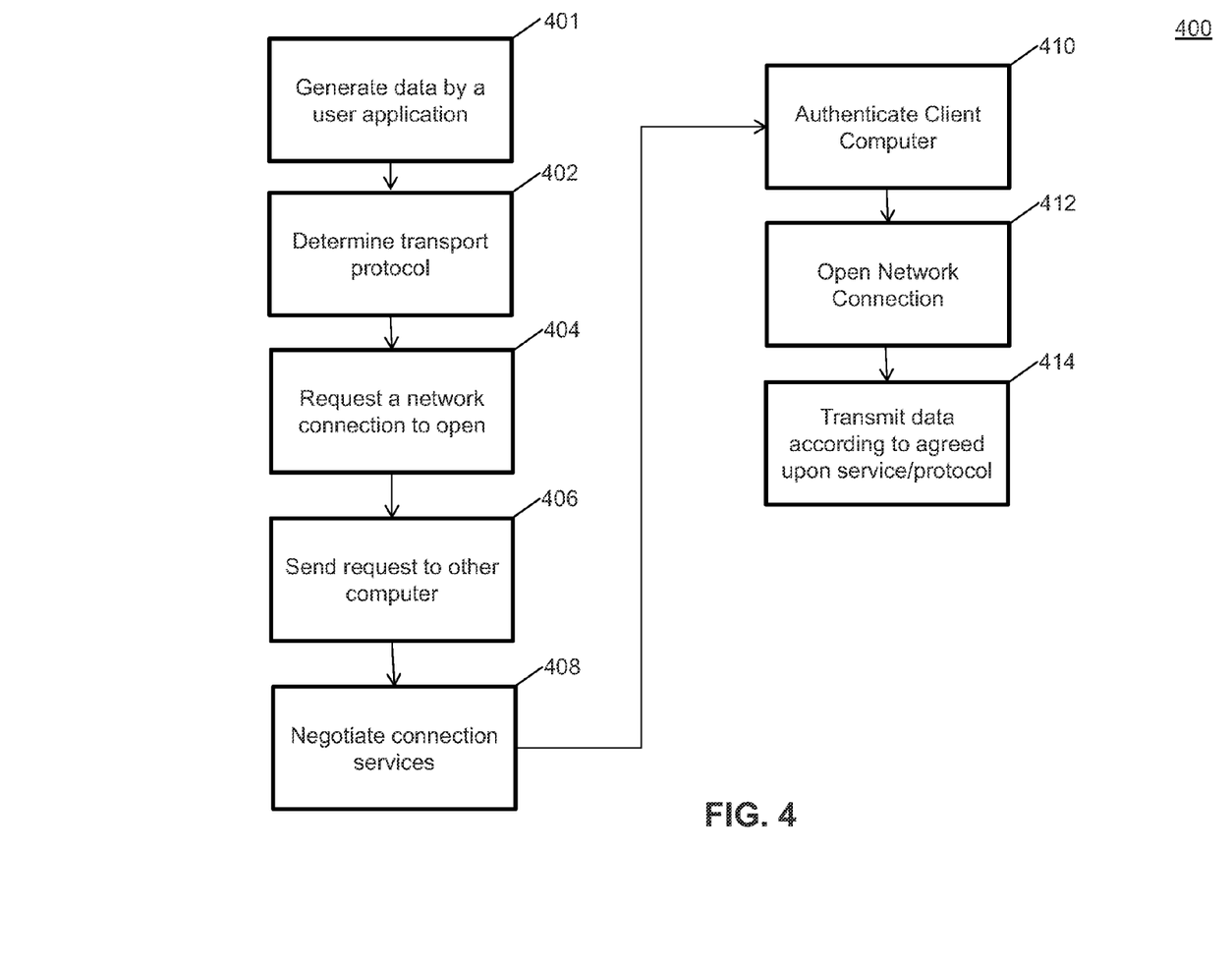
FIG. 4 illustrates a method for connecting a first computer system to a second computer system where the first computer system sends data to the second computer system according to an exemplary embodiment.

The network interface 104 or 114 may include different software layers for receiving and translating packets or messages sent over the network 120, which is described in more detail with references to FIGS. 2-4. From a very high level, the network interfaces 104, 114 receive data through networking hardware, and software layers directing the physical hardware of the network interfaces 104, 114 translate the data using uniform networking protocols so that data can be translated and understood by user applications executed by the processors 102, 112. For example, the host computer 100 may be a web-server, and the client computer 110 may request data describing a website hosted by the host computer 100. Using a physical connection, such as Ethernet, the client computer 110 sends a request to the host computer's 100 address, such as an IP address, and the host computer 110 responds with data comprising the website hosted by the host computer 100. The data comprising the website may be packaged according to a networking protocol, such as TCP/IP. Software modules interpret the TCP/IP packets and sends the data to a user application, such as a web browser, on the client computer 110.

FIG. 2 illustrates the host computer's 200 network communication software layers according to a first embodiment. The host computer 200 network communication software levels include a link layer 230, a transport protocol layer 234, a host connectivity services layer 236 a network application programming interface (API) 237, and a user application 238.

In conventional network communication software layers, the network API 237 would communicate directly with the transport protocol 234, and the transport protocol 234 would translate the data to be sent through a physical link, such as an Ethernet wire. Under this conventional system, the user application 238 was tasked with some networking processes, such as encrypting data, authenticating clients, and including public/private keys. According to the exemplary embodiments, the user application 238 is no longer responsible for such tasks because the host connectivity services layer 236 performs many of these tasks.

According to the embodiment shown in FIG. 2, the link layer 230 is the lowest layer of computer networking. In some embodiments, the link layer 230 may comprise a physical layer and a data link layer, such as those layers defined by the Open Systems Interconnection (OSI) model. In general, the link layer 230 consists of basic network hardware transmission technologies. The link layer 230 defines the means for transmitting raw bits, rather than data packets or messages, over a physical link. The physical layer may convert data into a physical signal that is transmitted over linking hardware. For example, the physical layer may define modulation techniques for sending signals over a physical link. The physical layer defines many other services, such as multiplexing, circuit switching, and many other services. The link layer 230 may define data transmission logic for any physical link, such as Ethernet, Infiniband, Bluetooth, USB, or any other network communication. In general, the link layer 230 defines methods and standards to connect multiple nodes of a network together.

The transport protocol 234 may be a set of protocols for transmitting data over a network. The transport protocol 234 may receive data from another level, organize the data into packets, and transmit the packets to another node of the network. The transport protocol 234 may also detect errors in packets received, request retransmission of a packet, or reorder packets that were received out of order. Alternatively, the transport layer 234 may send data as messages rather than data packets. For example, the transport protocol 234 may comprise TCP/IP, UDP, or Infiniband protocol. In some embodiments, the transport protocol 234 includes a plurality of protocols, and the transport protocol 234 selects one of the plurality of protocols used to transmits data.

The user application 238 is any software application stored on a computer readable medium and executed by a processor. The user application 238 may be any application installed on and provided by a host computer 200. For example, the user application 238 may be a web-based application accessed through a network address. In this example, a client computer may use the user application 238 executed by the host computer 200 through a web-browser. In another example, the user application 238 may be virtualization software used to provide a virtual machine including an operating system and a virtual application. The user application 238 may be any type of application hosted by a host computer 200.

The network API 237 may be a set of data structures and subroutines called by the user application 238 to perform some functionality with another layer. Conventional network APIs may call the transport protocol layer 234 to perform networked data transmission, but the network API 237 of the exemplary embodiments generally calls the connectivity services layer 236, as described below, but in some situations the network API 237 still communicates directly with the transport protocol 234. The network API 237 may be, for example, a network sockets-style API. Because the network API 237 interacts with the connectivity services layer 236, the conventional sockets-style network APIs must be extended to provide the methods required by the host connectivity services layer 236 so that the connectivity services layer can provide connection establishment, negotiation services, and subsequently, message framing services.

The host connectivity services layer 236 is a software layer between the transport protocol 234 and the network API 237. The host connectivity services layer 236 receives data from the network API 237 or the transport protocol 234 and translates the data. For example, if the user application 238 needs to send data to another node on the network, the user application 238 calls the network API 237 to generate a data transmission. The network API 237 transmits a message to the host connectivity services layer 236. For example, a message may be defined as an amount of data presented by the corresponding user application 238 in a single send request. As another example, a message may be defined as an amount of data having a specified or arbitrary length. The host connectivity services layer 236, in tandem with the transport protocol 234, begins a process, which is described in more detail below when referring to FIG. 4 or 5, of opening a network connection, authenticating the network connection, performing connectivity handshakes, and any other necessary processes for network communication.

When the host connectivity services layer 236 receives data from the transport protocol 234, the host connectivity services layer 236 organizes the data from the transport layer 234 into a message. The amount of data presented by the user application 238 may change depending on the network transmission (but the message size is constrained by a maximum message size parameter set by the host connectivity services layer 236). The host connectivity services layer 236 handles message framing during the initial network handshake. For example, if the transport protocol 234 is TCP/IP, the data received from the transport protocol 234 may be in the form of packets. The host connectivity services layer 236 waits until an entire message is received using TCP/IP and then passes the message to the user application 238. In this way, the user application 238 always receives data in a message-based format from the host connectivity services layer 236. Furthermore, a corresponding user application executed by a connected computer receives the data comprising the message as a complete message.

In this way, the host connectivity services layer 236 allows the user application 238 to simply send a message to the host connectivity services layer 236 through the network API 237 whenever network communication should be performed. The user application 238 is not responsible for authenticating connected computer systems, opening secure connections, encrypting data, or any other connection handshakes necessary to open network communication. In other words, the user application 238 does not know and does not need to know what operations and processes are performed to open network communication with another node or computer system. The exemplary embodiments assure the user application 238 of a secure connection every time because the host connectivity services layer 236 performs the necessary connectivity services for secure network connection.

As shown in FIG. 2, not all communications from the host connectivity services layer 236 are sent through the transport protocol 234. The host connectivity services layer 236 may bypass the transport protocol 234 when the transport protocol is not necessary for the particular communication being performed. For example, a network handshake or authentication process may not require the use of the transport protocol 234.

The connectivity services distinguish the host connectivity services layer 236 of the exemplary embodiments from a connectivity services library included in a conventional host computer 200. The connectivity services included in the host connectivity services layer 236 of the exemplary embodiments perform networking tasks previously allocated to the user application 238. The host connectivity services layer 236 also provides transport protocol flexibility. For example, the host connectivity services layer 236 may send a network transmission using TCP/IP when communication with a first client computer and subsequently send an Infiniband transmission to a second client computer. Because the user application 238 simply sends data messages to the host connectivity services layer 236, the user application 238 does not need to undergo a software update or modification to change the network transmission protocol used by the host computer 200.

Referring now to FIG. 3, the client computer 310 has similar software layers as the host computer 200 shown in FIG. 2. Like the host computer, the client computer 310 includes a link layer 340, a transport protocol 344, a user application 348, and a network API 347. The client connectivity services layer 346 is a software layer between the transport layer 344 and the user application 348, so the client connectivity services layer 346 is similar in nature to the host connectivity services layer 236 of the host computer. The network API 347 on the client computer may comprise a plurality of distinct software modules including, a winsock layer 347B and uConnect layer 347A.

The user application 348 may be any user application that uses network communication. For example, the user application 348 for the client computer 310 may be a web-browser.

The link layer 340 and the transport protocol 344 are substantially the same as the link layer 230 and transport protocol 234 of FIG. 2.

The network API 347 may be any network API used for network communication. The network API 347 includes a winsock module 347B to communicate between the user application 348 and the transport protocol 344. For example, the network API 347 may include Winsock 347B if the client computer 310 executes the Windows operating system. If the client computer 310 executes another operating system, the user application 348 may call another network API, such as Linux Sockets or BSD sockets on Macintosh.

In addition to Winsock layer 347B, the network API 347 may also include a second module referred to herein as uConnect 347A. uConnect 347A can expose the client connectivity services layer 346 to the user application 348. uConnect 347A can facilitate communication between user application 348 and the client connectivity services layer 346. For example, uConnect 347A may be a dynamic link library called by the user application 348 when services provided by connectivity services are called, such as authentication or data encryption. In order to call uConnect 347A, the user application 348 may need an initial software update, but any changes to network protocols will not require a software update.

Referring to FIG. 2 and FIG. 3, the host connectivity services layer 236 and the client connectivity services layer 346 include connectivity routines for secure connection, such as authentication, framing messages, encrypting data, connection service protocols, and assume identity functions. For example, the connectivity services layer 236, 346 may communicate with each other when a host computer 200 and a client computer 310 perform network communication. Of course, a situation where a host computer 200 communicates with another host computer 200 or a client computer 310 communicates with another client computer 310 can be imagined. In such situations, the host connectivity services layer 236 may communicate with another host connectivity services layer 236 on another host computer 200, or the client connectivity services layer 346 may communicate with another client connectivity services layer 346 on another client computer 310. The operation of the host and client connectivity services layer 236, 346 do not substantially change when communicating host-to-host or client-to-client.

The host and client connectivity services layer 236, 346 require certain connection protocols to be agreed upon between a host computer 200 and a client computer 310 before opening network communication. For example, the host connectivity services layer 236 may require that the client computer 310 and the host computer 200 agree to a message size before sending any data. The maximum message size is bounded by the system and/or transport characteristics. In one embodiment, the message size may range between 1 and 65536 bytes, or the system limit if smaller This handshake may include requiring both the host connectivity services layer 236 of the host computer 200 and the client connectivity services layer 346 on the client computer 310 to further agree on a transmission protocol. For example, the client computer 310 may not have an Infiniband port, so Infiniband protocol cannot be used, and TCP/IP or UDP is selected.

Both the host connectivity services layer 236 and the client connectivity services layer 346 include a message framing service. The message framing service provides a user application with only a full message. If a partial message is received, or some of the message is still incoming, the host or client connectivity services layer 236, 346 wait to provide the received data to the user application 238 or 348 until a full message has been received. The host connectivity services layer 236 and the client connectivity services layer 346 may agree to a method for resolving disparate message sizes, such as employing no message framing, using the smallest values supplied by the two application, use a minimum value supplied by the host connectivity services layer 236 and the client connectivity services layer 346, or both the host connectivity services layer 236 and the client connectivity services layer 346 must specify the same value. If the host connectivity services layer 236 and the client connectivity services layer 346 do not conform to the selected method, connection will fail between the host computer 200 and the client computer 310.

The host connectivity services layer 236 and the client connectivity services layer 346 also perform an authentication service. The authentication service allows the host computer 200 to validate access from the client computer 310. For example, the host connectivity services layer 236 may request from the client connectivity services layer 346 authentication credentials. The client connectivity services layer 346 may supply the credentials and gain access if the host connectivity services layer 236 recognizes the supplied credentials. Alternatively, the client connectivity services layer 346 may request guest access. In some embodiments, the host connectivity services layer 236 does not require authentication before opening a connection.

Yet another service provided by the host connectivity services layer 236 and the client connectivity services layer 346 is an encryption service. For example, the host connectivity services layer 236 and the client connectivity services layer 346 may encrypt data received from the user application 238, 348 respectively. For example, the host connectivity services layer 236 and the client connectivity services layer 346 may encrypt all data sent through the physical link using SSL-TLS. The encryption method must be agreed upon by the host connectivity services layer 236 and the client connectivity services layer 346 before transmitting encrypted data. The encryption servicer may further include the use of public and private keys.

Further still, the host connectivity services layer 236 and the client connectivity services layer 346 may provide an assume identity service. This function allows the host computer 200 to assume the user identity of an accepted client computer 310 connection. Using authentication information and credentials provided by the client computer 310, the host computer may assume certain variables about the user, such as language, convention, and other variables. The authentication information provided by the client computer 310 may set these variables without the client computer 310 providing them.

FIG. 4 illustrates a method 400 for opening a network connection and sending data according to the exemplary embodiments. In the method of FIG. 4, a first computer system sends data to a second computer system. The method 400 begins in step 401 when a user application generates data to be sent over a network. After the user application generates data, the connectivity services layer of the first computer or the connectivity services layer of the second computer determines a transport protocol for the data transmission in step 402. In one embodiment, the connectivity services layer of the second computer provides supported transport protocols, and, using the supported transport protocols provided by the second computer, the first computer determines which transport protocol to use during network communication. In another embodiment, the connectivity services layer of the first computer may store configuration parameters of all computers on the network in computer readable-medium, and the configuration parameters identify the supported transport protocols. In this embodiment, the connectivity services layer of the first computer may first consult the computer-readable medium before opening a network communication with the second computer. Subsequently, in step 404, the user application requests the connectivity services layer to open a network connection. In response, the connectivity services layer of the first computer sends a request to the second computer, which also has a connectivity services layer, in step 406.

Also during connection establishment, the connectivity services layer of the first computer and the connectivity services layer of the second computer begin a negotiation session to negotiate connection services in step 408. The handshaking performed in step 408 may involve authentication settings, message length settings, message encryption settings, and any other network communication services that need to be negotiated. It is assumed that the first computer and the second computer agree to all communication services, but if any pertinent communication settings cannot be agreed upon, the communication attempt fails. For example, if the message size format cannot be agreed upon exactly, the network communication socket may not open.

After establishing a connection, the first computer may require the connectivity services layer of the second computer to provide credentials to authenticate the second computer in step 410. The authentication process of step 410 may involve requesting credentials from a client computer, receiving the credentials, and validating the credentials as recognized and valid credentials. If a client computer initiates connection, step 410 may involve receiving a request for credentials, providing credentials, and waiting for the host computer to confirm the credentials. It should be noted that the first computer may provide credentials to the second computer, depending on which computer is a host computer. In step 410, the second computer may request guest privileges because the second computer does not have proper network credentials. Depending on the security of the information to be sent, the first computer may grant guest privileges. Upon receiving and verifying the second computer's credentials, the connectivity services layer opens a network connection in step 412 and transmits data according to the agreed upon services and determined transport protocols in step 414. The transmitted data may be in the format of a message and may include encryption (SSL). Message creation and encryption are both performed by the connectivity services layer of the first computer. Also, because the first and second computer agreed to the message format and the encryption level during connection establishment, the connectivity services layer of the second computer can translate the encrypted data and form the transmitted data into the message.

Alternatively, the connectivity services layer of the first computer and the connectivity services layer of the second computer may inform the user applications respectively running on the first and second computers that the network connection has been established, and the two applications exchange data.

Figure 5:
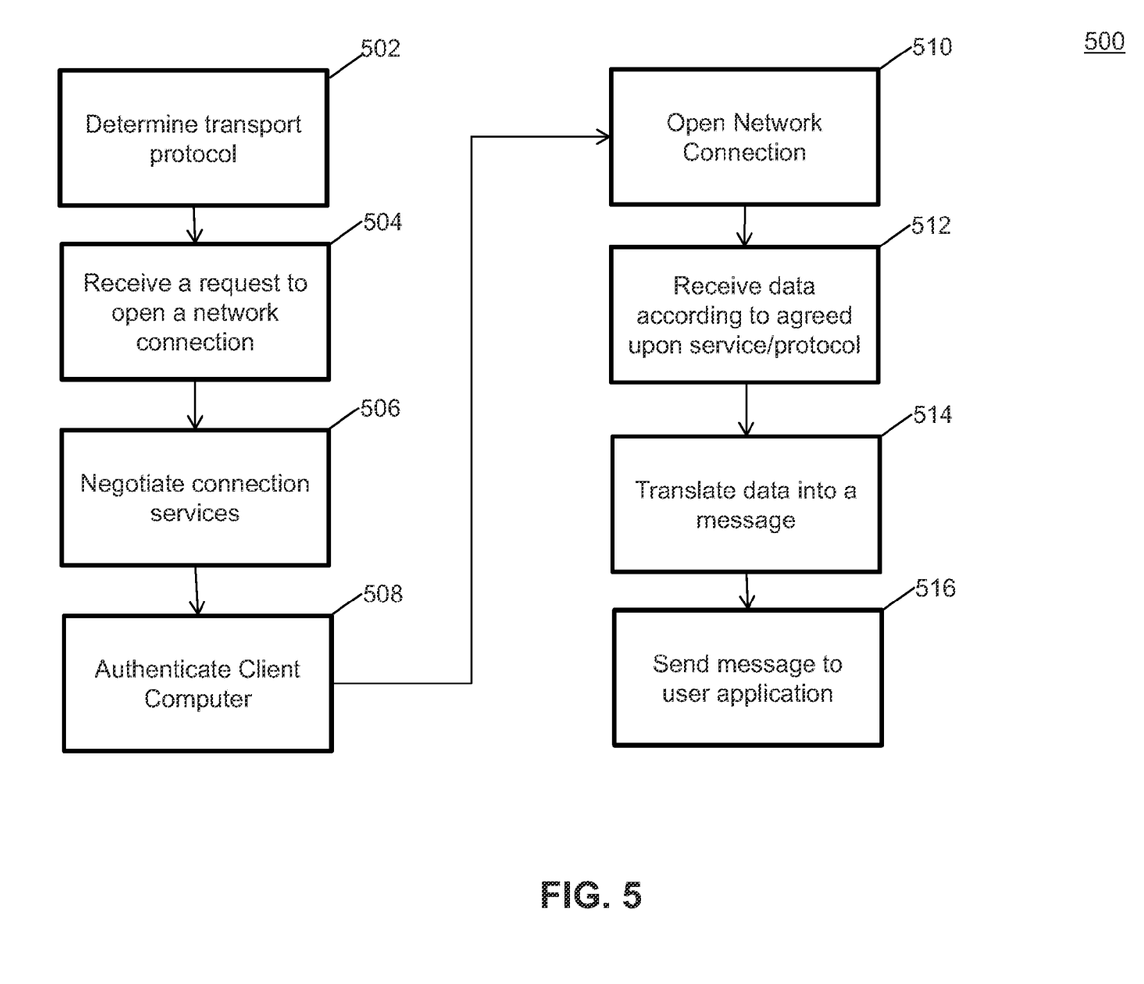
FIG. 5 illustrates a method for connecting a first computer system to a second computer system where the first computer system receives data from the second computer system according to an exemplary embodiment.

FIG. 5 illustrates a method 500 for opening a network connection and receiving data according to the exemplary embodiments. In the method of FIG. 5, a first computer system receives data from a second computer system. The method 500 begins in step 502 the connectivity services layer of the first computer and the connectivity services layer of the second computer determine the transmission protocol for the data transmission in step 504. In one embodiment, the connectivity services layer of the second computer provides supported transport protocols, and using the supported transport protocols provided by the second computer, the first computer determines which transport protocol to use during network communication. In another embodiment, the connectivity services layer of the first computer may store configuration parameters of all computers on the network in computer readable-medium, and the configuration parameters identify the supported transport protocols. In this embodiment, the connectivity services layer of the first computer may first consult the computer-readable medium before opening a network communication with the second computer. In response, the connectivity services layer of the first computer receives a request from the second computer to open a network communication.

Also during connection establishment, the connectivity services layer of the first computer and the connectivity services layer of the second computer begin a negotiation session to negotiate connection services in step 506. The handshaking performed in step 506 may involve authentication settings, message length settings, message encryption settings, and any other network communication services that need to be negotiated. It is assumed that the first computer and the second computer agree to all communication services, but if any pertinent communication settings cannot be agreed upon, the communication attempt fails. For example, if the message size format cannot be agreed upon exactly, the network communication socket will not open.

After establishing a connection, the first computer may require the connectivity services layer of the second computer to provide credentials to authenticate the second computer in step 508. The authentication process of step 508 may involve requesting credentials from a client computer, receiving the credentials, and validating the credentials as recognized and valid credentials. In step 508, the second computer may request guest privileges because the second computer does not have proper network credentials. Depending on the security of the information to be sent, the first computer may grant guest privileges. Upon receiving and verifying the second computer's credentials, the connectivity services layer opens a network connection in step 510 and receives data according to the agreed upon services and transport protocols in step 512.

After receiving data from the second computer, the connectivity services layer of the first computer translates the data into a message according to the agreed message format in step 514. The connectivity services of the first computer may wait until all data for the message is received to reconstruct the message. Step 514 may involve decrypting an encrypted message. After the message has been translated, the connectivity services layer of the first computer sends the message to the user application in step 516.

As shown by the exemplary embodiments, network communication may be more efficiently and securely handled by the connectivity services layer. By inserting the connectivity services layer between a user application and a networking stack, the user application no longer has to perform networking tasks such as data encryption, handshaking, and authentication. As such, network communication methods and protocols may change without the knowledge of the user application and without requiring a software update for the user application. The connectivity services layer also provides flexibility in how network communication is performed because the user application is agnostic to the method of data transmission. In other words, the user application simply provides data to be sent, but the connectivity services layer can transmit the received data according to any method or protocol without changing the nature of the user application.

The exemplary embodiments can include one or more computer programs that embody the functions described herein and illustrated in the appended flow charts. However, it should be apparent that there could be many different ways of implementing aspects of the exemplary embodiments in computer programming, and these aspects should not be construed as limited to one set of computer instructions. Further, those skilled in the art will appreciate that one or more acts described herein may be performed by hardware, software, or a combination thereof, as may be embodied in one or more computing systems.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "generating" or "determining" or "receiving" or "sending" or "negotiating" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that numerous alternative components and embodiments that may be substituted for the particular examples described herein and still fall within the scope of the invention.

What is claimed is:

1. A computer program product, comprising a non-transitory computer usable medium having a computer readable program code embodied therein, the computer readable program code adapted to be executed to implement a method for network communication, the method comprising:
   providing a first system, wherein the first system comprises distinct software modules, and wherein the distinct software modules comprise a user application module, a network sockets-style application programming interface module, a connectivity services module, and a transport protocol module, wherein the user application module and the network sockets-style application programming interface module communicate with each other directly;
   generating, by the user application module, data to be sent over a network link based on at least one process performed by the user application module or information entered by a user;
   sending, by the network application programming interface module, a request to open the communication link to the connectivity services module;
   determining, by the connectivity services module of the first system, a transport protocol that will be used to transmit data over a network communication link;
   sending, by the connectivity services module of the first system, a request to open the network communication link to the transport module in response to a request by the user application module;
   negotiating, by the connectivity services module of the first system or a connectivity services modules of a second system, connection services to be performed on data that will be transmitted over the network communication link with a connectivity services module of a second system;
   receiving, by the connectivity services of the first system, a request for credentials of the first system for sending to the connectivity services module of the second system to verify that the credentials match an authenticated computer;
   opening, by the connectivity services module of the first system, a network connection between the first system and the second system when the first system's credentials have been verified by the connectivity services module of the second system; and
   transmitting, by the transport protocol module and the connectivity services module of the first system, the data to the second system according to the determining network protocol and negotiated connection services.

2. The computer program product of claim 1, wherein negotiating connection services to be performed on data that will transmitted over the network communication link with the connectivity services module of the second system comprises:
   determining a size and format for messages to be sent between the second computer and the first computer, determining is performed by the connectivity services module of the second system or the connectivity services of the first system during a network handshake.

3. The computer program product of claim 2, wherein the first system does not open a network connection with the second system if the connectivity services module of the first system and the connectivity services module of the second system cannot agree to a message length.

4. The computer program product of claim 1, wherein negotiating connection services to be performed on data that will transmitted over the network communication link with the connectivity services module of the second system comprises:
   determining an encryption protocol with which to encrypt the data when transmitting the data over the network link, wherein determining is performed by the connectivity services module of the second system.

5. The computer program product of claim 4, wherein the encryption protocol is secure sockets layer (SSL) or transport layer security (TLS).

6. The computer program product of claim 1, further comprising: assuming an identity of the first system based on the provided credentials to set task variables of the second system, wherein determining is performed by the connectivity services module of the second system.

7. The computer program product of claim 1, wherein the transport protocol is TCP/IP.

8. The computer program product of claim 1, wherein the transport protocol is Infiniband.

9. A computer program product, comprising a non-transitory computer usable medium having a computer readable program code embodied therein, the computer readable program code adapted to be executed to implement a method for network communication, the method comprising:
   providing a first system, wherein the first system comprises distinct software modules, and wherein the distinct software modules comprise a user application module, a network sockets-style application programming interface module, a connectivity services module, and a transport protocol module, wherein the user application module and the network sockets-style application programming interface module communicate with each other directly;
   sending, by the network application programming interface module, a request to open the communication link to the connectivity services module;
   determining, by the connectivity services module of the first system, a transport protocol that will be used to transmit data over a network communication link;
   sending, by the connectivity services module of the first system, a request to open the network communication link to the transport module in response to a request by the user application module;
   negotiating, by the connectivity services module of the first system or a connectivity services modules of a second system, connection services to be performed on data that will be transmitted over the network communication link with a connectivity services module of a second system;
   receiving, by the connectivity services module of the first system, a request from the connectivity services of the second system for credentials of the first system;
   sending, by the connectivity services module of the first system, the first system's credentials to the connectivity services module of the second system;
   opening, by the connectivity services module of the first system, a network connection between the first system and the second system when the first system's credentials have been verified by the connectivity services module of the second system; and
   transmitting, by the transport protocol module and the connectivity services module of the first system, the data to the second system according to the determined network protocol and negotiated connection services.

10. The computer program product of claim 9, wherein negotiating connection services to be performed on data that will transmitted over the network communication link with the connectivity services module of the second system comprises:
   determining an encryption protocol with which to encrypt the data when transmitting the data over the network link, wherein determining is performed by the connectivity services module of the second system.

11. The computer program product of claim 10, wherein the encryption protocol is secure sockets layer (SSL) or transport layer security (TLS).

12. The computer program product of claim 9, further comprising:
   assuming an identity of the first system based on the provided credentials to set task variables of the second system, wherein determining is performed by the connectivity services module of the second system.

13. The computer program product of claim 9, wherein the transport protocol is TCP/IP.

14. The computer program product of claim 9, wherein the transport protocol is Infiniband.

15. A computer program product, comprising a non-transitory computer usable medium having a computer readable program code embodied therein, the computer readable program code adapted to be executed to implement a method for network communication, the method comprising:
   providing a first system, wherein the first system comprises distinct software modules, and wherein the distinct software modules comprise a user application module, a network sockets-style application programming interface module, a connectivity services module, and a transport protocol module, wherein the user application module and the network sockets-style application programming interface module communicate with each other directly;
   determining, by the connectivity services module of the first system, a transport protocol that will be used to transmit data over the network communication link based on sending, by the network application programming interface module, a request to open a communication link to the connectivity services module;
   receiving, by the connectivity services module of the first system, a request to open a communication link from the transport module, wherein the request was initiated by the connectivity services module of a second system;
   negotiating, by the connectivity services module of the first system or a connectivity services module of the second system, connection services to be performed on data that will be transmitted over the network communication link during a network handshake, wherein negotiating includes determining a size and format for messages to be sent from the second computer to the first computer;
   receiving, by the connectivity services module of the first system, by the connectivity services of the first system a request for credentials of the first system for sending the credentials to the second system to verify that the credentials match an authenticated computer;
   opening, by the connectivity services module of the first system, a network connection between the first system and the second system when the first system's credentials have been verified by the connectivity services module of the second system;
   receiving, by the transport protocol module of the first system, data from the second system according to the determining network protocol and negotiated connection services;
   sending, by the transport protocol module of the first system, the received data to the connectivity services module of the first system;
   translating, by the connectivity services module of the first system, the received data into a message based on the agreed upon message size and format; and
   sending, by the connectivity services module of the first system, the message to the user application module.

16. The computer program product of claim 15, wherein negotiating connection to be performed on data that will transmitted over the network communication link with the connectivity services module of the second system comprises:
  determining an encryption protocol with which the received data will be encrypted, wherein determining is performed by the connectivity services module of the second system during a network handshake.

17. The computer program product of claim 16, wherein the encryption protocol is secure sockets layer (SSL) or transport layer security (TLS).

18. The computer program product of claim 15, wherein the transport protocol is TCP/IP.

19. The computer program product of claim 15, wherein the transport protocol is Infiniband.

20. A computer program product, comprising a non-transitory computer usable medium having a computer readable program code embodied therein, the computer readable program code adapted to be executed to implement a method for network communication, the method comprising:
  providing a first system, wherein the first system comprises distinct software modules, and wherein the distinct software modules comprise a user application module, a network sockets-style application programming interface module, a connectivity services module, and a transport protocol module, wherein the user application module and the network sockets-style application programming interface module communicate with each other directly;
  determining, by the connectivity services module of the first system, a transport protocol that will be used to transmit data over the network communication link based on sending, by the network application programming interface module, a request to open a communication link to the connectivity services module;
  receiving, by the connectivity services module of the system, a request to open a communication link from the transport module, wherein the request was initiated by a connectivity services module of a second system;
  negotiating, by the connectivity services module of the first system, connection services to be performed on data that will be transmitted over the network communication link with a connectivity services module of a second system during a network handshake, wherein negotiating includes determining a size and format for messages to be sent between the second system and the first system;
  determining, by the connectivity services module of the first system, whether to require credentials before allowing access to the second system;
  opening, by the connectivity services module of the first system, a network connection between the first system and the second system when the second system's credentials have been verified by the connectivity services module or when the connectivity services module of the first system grants access to the second system without requiring validated credentials;
  receiving, by the transport protocol module of the first system, data from the second system according to the determined network protocol and negotiated connection services;
  sending, by the transport protocol module of the first system, the received data to the connectivity services module of the first system;
  translating, by the connectivity services module of the first system, the received data into a message based on the agreed upon message size and format; and
  sending, by the connectivity services module and the network application interface module of the first system, the message to the user application module.

* * * * *